Aug. 10, 1926.

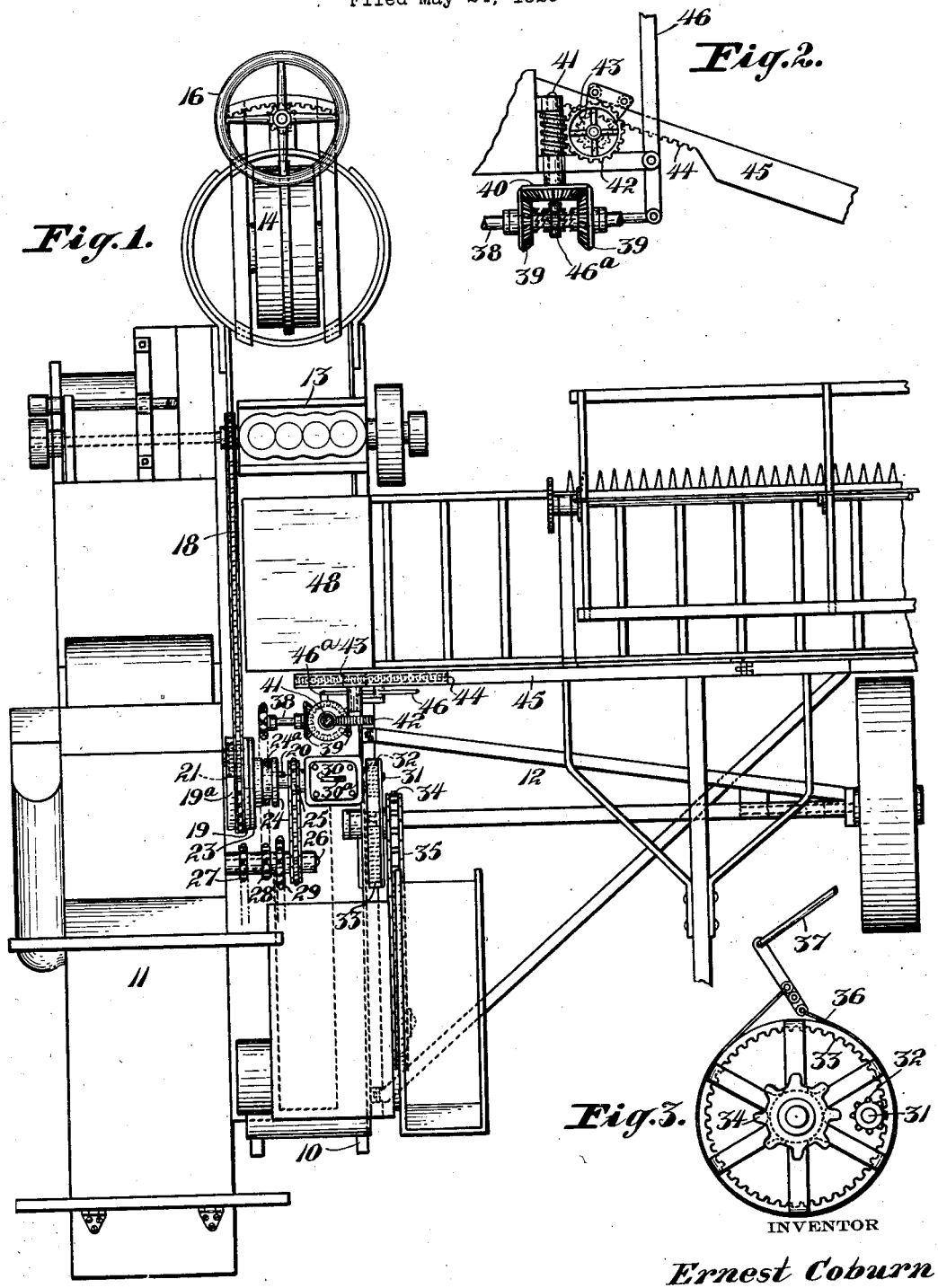

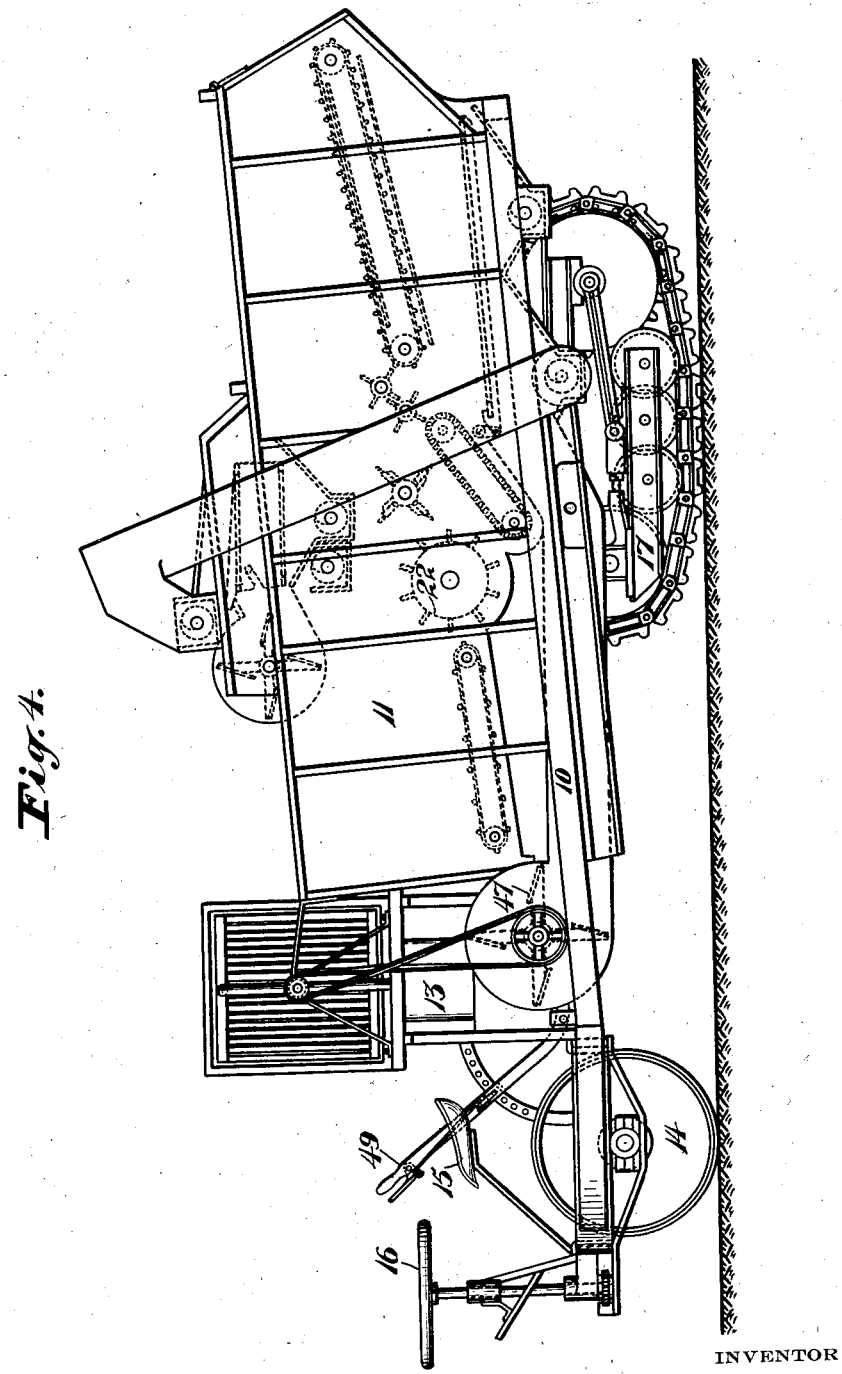

E. COBURN 1,595,383

SELF PROPELLED COMBINED HARVESTER

Filed May 24, 1920      3 Sheets-Sheet 3

INVENTOR
*Ernest Coburn*
BY
*Chas. E. Journand*
ATTORNEY

Patented Aug. 10, 1926.

1,595,383

UNITED STATES PATENT OFFICE.

ERNEST COBURN, OF SPOKANE, WASHINGTON, ASSIGNOR, BY MESNE ASSIGNMENTS, TO CATERPILLAR TRACTOR CO., A CORPORATION OF CALIFORNIA.

SELF-PROPELLED COMBINED HARVESTER.

Application filed May 24, 1920. Serial No. 383,643.

This invention relates to self-propelled combined harvesters wherein a thresher and header are connected together for combined operation in the field. More particularly, the present invention relates to driving and controlling mechanism for a self-propelled harvester of this type. The object of my invention is to simplify and improve the operating and controlling mechanism.

Prior devices with which I am familiar have always driven the entire mechanism of the separator and the header through the shaft of the threshing cylinder. This is objectionable as imposing too much strain on a high speed shaft and necessitating complications and extra friction in the use of reducing gears. In the present mechanism, I use a counter driving shaft arranged at one side of the thresher near the middle thereof and driven directly by the motor at a relatively low speed. I connect the cylinder shaft thereto by simply interposing an internal gear and pinion which will afford the proper speed. The main drive shaft for the separator and the header which carries also the beater is connected by a simple sprocket and chain device to the counter shaft. One end of the counter shaft operates a change speed and reverse gear set which drives the traction devices through a speed reducing mechanism, which latter affords means for effectively applying a brake. The present mechanism includes controllable friction clutch mechanism for throwing the entire operating mechanism in and out of operation, controlling means for the gear set shiftable to vary the forward speed and also to reverse the direction of the machine, and controllable leveling mechanism for adapting the harvester to side hill work, and controlling means for the brake of the traction devices. The controls for all of the foregoing are arranged adjacent a platform which occupies an elevated position forwardly of the separator so that one man without changing his position can easily control the entire mechanism and observe the operation thereof. This convenient arrangement of all of the controls greatly reduces the work of the "separator man" and lessens the danger of accidents to the mechanism or clogging up the separator.

Referring to the accompanying drawings:

Fig. 1 shows a plan view of a portion of a harvester embodying my invention.

Fig. 2 shows a detail in elevation of the leveling mechanism.

Fig. 3 shows a detail in elevation of the brake mechanism for the traction device.

Fig. 4 shows a side elevation of the harvester.

Figure 5:
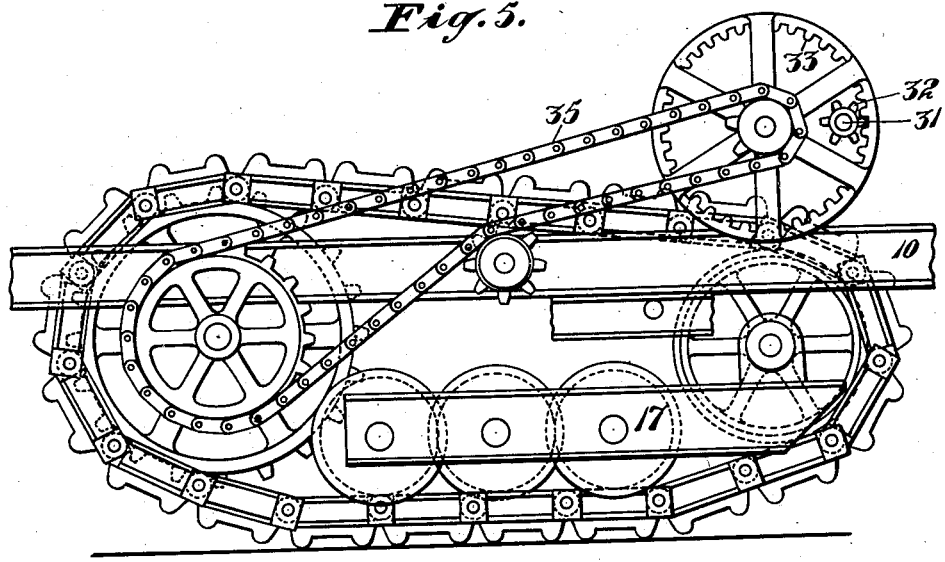
Fig 5 shows a side elevation of the track laying mechanism employed in the harvester and the driving means therefor.
Figure 6:
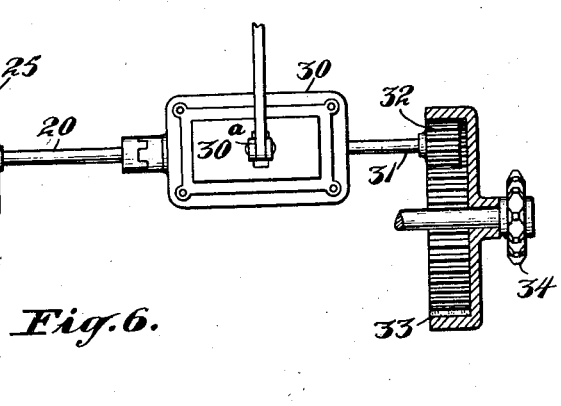
Fig. 6 shows a sectional view in plan of the counter-driving shaft for the harvester mechanism.

The machine, as herein illustrated, comprises a truck frame 10 carrying a separator 11 at one side and a header 12 at the other side, the latter being hinged to the truck frame for movement in a vertical plane to accommodate itself to side hill work. A motor 13 is arranged at the front of the truck frame near a front steering wheel 14. A pilot seat 15 is arranged over the steering wheel and adjacent the motor, steering of the wheel being accomplished through a hand-wheel 16. A suitable load bearing truck 17 is arranged at the rear of the truck frame and in the present case I show it in the form of a single chain track, although it is obvious a plurality of these tracks may be used one at either side; also round wheels may be substituted for the tracks. The crank shaft of the motor carries a sprocket wheel which connects by a chain 18 with a sprocket wheel 19 fitted loosely on the hub of an internal gear 19ª, the latter being fixed on a counter shaft 20. The internal gear drives a pinion 21 on the shaft of the separating cylinder 22. A friction clutch disc 23 keyed on the hub of the internal gear and controlled by a sliding collar 24 operated by a lever 24ª connects the sprocket wheel 19 to the counter shaft 20. The face of the sprocket wheel 19 forms one member of the clutch mechanism.

The counter shaft 20 carries a sprocket wheel 25 which operates a shaft 26, the latter being the main drive shaft for the separator and header mechanism and serving also as the beater shaft of the separator. This shaft 26 carries a sprocket wheel 27 which operates the pickers and elevators not shown and a sprocket wheel 28 for operating the leveling mechanism of the header herein-after to be described. A third sprocket wheel 29 is also fixed on the shaft 26 for operating the cutting knife, draper and reel of the header through suitable connections not herein shown.

The counter shaft 20 enters a gear housing 30 where change speed and reverse gears are arranged and controlled by a shift lever 30ª. This gear set which may be of any suitable form drives a shaft 31 at variable speeds forward and also in a reverse direction. Said shaft 31 carries a pinion 32 meshing with an internal gear 33, the latter carrying a sprocket pinion 34 which connects by a chain 35 with a sprocket wheel on the truck mechanism for propelling the machine. A brake band 36 is arranged on the periphery of the internal gear 33 and controlled by a lever 37 for retarding the progress of the machine when going down hill.

The leveling mechanism before referred to includes a shaft 38 with bevel pinions 39 constantly in mesh with a bevel gear 40 on a vertical worm shaft 41, which latter drives the worm gear 42 to operate a spur pinion 43 which meshes with a tooth rack 44 on a leveling arm 45. The leveling arm connects at its outer end to the header frame. A lever 46 serves to slide a clutch 46ª into engagement with either of the bevel pinions 39 for controlling the direction of movement of the leveling arm. The worm gearing will serve to lock the pinion 43 against movement when the bevel pinions 39 are in neutral position.

I show a main separator fan 47 at the front of the thresher and in line with the motor with its shaft directly connected to the crank shaft.

It will be seen from the foregoing that the motor has a direct driving connection with the separator fan and also with the countershaft 20. The cylinder shaft for the separator is driven by the counter shaft through suitable speed increasing gearing, and the main drive shaft 26 for the separator and header mechanism is driven from the counter shaft by direct connection therewith. The propelling mechanism is also driven by the countershaft through the medium of change speed gearing and speed reducing gearing. Thus, it is possible to vary the forward speed of the harvester and also to reverse the direction of the same without changing the speed or direction of the separator or header mechanism. It will be noted that all of the driving mechanism is at one side of the separator and compactly arranged and related so that the control levers for all parts of the mechanism will be closely associated. These control levers are arranged around a platform 48 on which the "separtor man" stands. The position of this platform gives the "separator man" a point of vantage from which all operating parts of the machnie may be observed Without changing his position, he can operate the shift lever 30ª to advance or retard the speed of progress of the machine, operate the leveling mechanism to accommodate the machine to side hill work, operate the clutch 23, and also the brake 36.

The pilot or steersman looks after the steering of the harvester and attends to the motor from his seat at the forward end of the harvester. I prefer to arrange a lever 49 adjacent the pilot seat, which lever controls the raising and lowering of the front of the header frame to vary the height of cut, inasmuch as the position of the pilot is closer to the ground than that of the "separator man", and hence the former is in better position to observe the height of the grain.

Various changes in the construction and arrangement of the several parts herein shown and described may be employed without departing from the spirit of my invention as disclosed in the appended claims.

This application is a companion of my copending application Serial No. 383,644, filed May 24, 1920.

Having thus described my invention, what I claim and desire to secure by Letters Patent is:

1. In a self-propelled combined header and thresher including traction devices, the combination with a separator, cylinder and motor, of a counter shaft driven by the motor, operating connections beween said counter shaft and the separator cylinder, a main drive shaft for the header and thresher also connected to said counter shaft, and driving mechanism for the traction devices connected also to said counter shaft, and speed increasing gearing between the counter shaft and separator cylinder.

2. In a self-propelled combined header and thresher including traction devices, the combination with a separator, cylinder and motor, of a counter shaft driven by the motor, operating connections between said counter shaft and the separator cylinder, a main drive shaft for the header and thresher also connected to said counter shaft, driving mechanism for the traction devices connected also to said counter shaft, and speed reducing gearing included in the connections between the counter shaft and traction devices.

3. In a self-propelled combined header and thresher including traction devices, the combination with a separator, cylinder and motor, of a counter shaft driven by the motor, operating connections between said counter shaft and the separator cylinder, a main drive shaft for the header and thresher also connected to said counter shaft, driving mechanism for the traction devices connected also to said counter shaft, and change speed and reverse gearing included in the connections between the counter shaft and traction devices.

4. In a self-propelled combined header and thresher including traction devices, the combination with a separator, the separator cylinder and a motor, of a counter shaft driven by the motor, operating connections between said counter shaft and the separator cylinder, a main drive shaft for the header and thresher also connected to said counter shaft, driving mechanism for the traction devices connected also to said counter shaft, an internal gear and pinion included in the connections between the counter shaft and traction devices for reducing the speed of the latter, and a brake band on the periphery of the internal gear.

5. In a self-propelled combined header and thresher including traction devices, the combination with a motor and a separator mechanism, of a counter shaft, a constantly rotating member thereon driven by the motor, a clutch device for the constantly rotating member and counter shaft, controlling means for said clutch device, a main drive shaft for the header and thresher operated by said counter shaft, and driving mechanism for the traction devices also connected to said counter shaft.

6. In a self-propelled combined header and thresher including traction devices, the combination with a motor and a separator mechanism, of a counter shaft, a constantly rotating member thereon driven by the motor, a clutch device for the constantly rotating member and counter shaft, controlling means for said clutch device, a main drive shaft for the header and thresher operated by said counter shaft, and driving mechanism for the traction devices also connected to said counter shaft, the operating connections for the traction devices including variable speed and reverse gearing, and means for shifting said gearing arranged adjacent the controlling means for the aforesaid clutch.

7. In a self-propelled combined header and thresher including traction devices, the combination with a motor and a separator mechanism, of a counter shaft, a constantly rotating member thereon driven by the motor, a clutch device for the constantly rotating member and counter shaft, controlling means for said clutch device, a main drive shaft for the header and thresher operated by said counter shaft, and driving mechanism for the traction devices also connected to said counter shaft, the driving connections for the traction devices including a brake and control means for the brake arranged adjacent the controlling means for the aforesaid clutch.

8. In a self-propelled combined header and thresher including traction devices, the combination with a motor and a separator mechanism, of a counter shaft, a constantly rotating member thereon driven by the motor, a clutch device for the constantly rotating member and counter shaft, controlling means for said clutch device, a main drive shaft for the header and thresher operated by said counter shaft, driving mechanism for the traction devices also connected to said counter shaft, leveling mechanism for maintaining the thresher substantially upright regardless of variations in the angular position of the header, said leveling mechanism being operated by the main drive shaft, and control means for the leveling mechanism arranged adjacent the control means for the clutch.

9. In a self-propelled combined header and thresher, including traction devices, a platform occupying an elevated position between the thresher and header, operating mechanism for the thresher, header and traction devices, including a clutch for throwing the power mechanism in and out of operation, a leveling mechanism for varying the inclination of the thresher relative to the header, change speed gears included in the connections for the traction devices and controlling means for the said clutch, leveling mechanism and change speed gears arranged adjacent to, and accessible from, the platform.

10. In a self-propelled combined header and thresher, including traction devices, a platform occupying an elevated position between the thresher and header, operating mechanism for the thresher, header and traction devices including a clutch for throwing the power mechanism in and out of operation, a leveling mechanism for varying the inclination of the thresher relative to the header, change speed gears included in the connections for the traction devices, and controlling means for the said clutch, leveling mechanism and change speed gears arranged adjacent to, and accessible from, the platform, and a brake included in the connections for the traction devices also controlled from said platform.

11. In a combined header and thresher, a separator having a separator cylinder, a motor, a counter driving shaft connected thereto, speed increasing gearing connecting the counter shaft to the separator cylinder, and a main drive shaft for the header and thresher also connected to said counter driving shaft.

12. In a combined header and thresher, a separator having a separator cylinder, a motor, a counter driving shaft connected thereto, speed increasing gearing connecting the counter shaft to the separator cylinder, and a main drive shaft for the header and thresher also connected to said counter driving shaft, said main driving shaft serving also as the shaft for the beater or the separator.

13. In a combined header and thresher, a separator having a separator cylinder, a motor, a counter driving shaft connected thereto, speed increasing gearing connecting the counter shaft to the separator cylinder, and a main drive shaft for the header and thresher also connected to said counter driving shaft, said speed increasing gearing comprising an internal gear on the counter shaft and a pinion on the cylinder shaft.

14. In a combined header and thresher, a separator having a separator cylinder, a motor, a counter driving shaft connected thereto, speed increasing gearing connecting the counter shaft to the separator cylinder, and a main drive shaft for the header and thresher also connected to said counter driving shaft, and a controllable clutch device for disconnecting the counter shaft from the motor.

15. In a combined header and thresher, a separator having a separator cylinder, a motor, a counter driving shaft connected thereto, speed increasing gearing connecting the counter shaft to the separator cylinder, and a main drive shaft for the header and thresher also connected to said counter driving shaft, and a separator fan in line with, and directly connected to, the motor.

16. In a combined header and thresher, a motor, a cylinder, a fan and a beater, and operative connections for the same comprising a direct connection between the motor and fan, a counter shaft directly connected to the motor, and operative connections between the counter shaft and cylinder and the counter shaft and beater.

In testimony whereof I have hereunto set my hand.

ERNEST COBURN.